United States Patent
Li et al.

(10) Patent No.: US 10,855,188 B2
(45) Date of Patent: Dec. 1, 2020

(54) HYBRID SECONDARY-SIDE REGULATION

(71) Applicant: DIALOG SEMICONDUCTOR INC., Campbell, CA (US)

(72) Inventors: Yong Li, Campbell, CA (US); Cong Zheng, Campbell, CA (US); Xiaoyan Wang, Campbell, CA (US); Wenduo Liu, Campbell, CA (US)

(73) Assignee: DIALOG SEMICONDUCTOR INC., Campbell, CA (US)

(*) Notice: Subject to any disclaimer, the term of this patent is extended or adjusted under 35 U.S.C. 154(b) by 0 days.

(21) Appl. No.: 16/588,854

(22) Filed: Sep. 30, 2019

(65) Prior Publication Data
US 2020/0036291 A1 Jan. 30, 2020

Related U.S. Application Data

(60) Division of application No. 16/100,934, filed on Aug. 10, 2018, now Pat. No. 10,461,646, which is a continuation of application No. PCT/US2018/013655, filed on Jan. 12, 2018.

(60) Provisional application No. 62/445,660, filed on Jan. 12, 2017.

(51) Int. Cl.
| | | |
|---|---|---|
| H02M 3/335 | (2006.01) |
| H02M 1/36 | (2007.01) |
| H02M 1/00 | (2006.01) |
| H02M 1/32 | (2007.01) |
| H02J 7/00 | (2006.01) |

(52) U.S. Cl.
CPC ... *H02M 3/33507* (2013.01); *H02M 3/33592* (2013.01); *H02J 7/00* (2013.01); *H02M 1/32* (2013.01); *H02M 1/36* (2013.01); *H02M 2001/0058* (2013.01); *Y02B 70/1475* (2013.01)

(58) Field of Classification Search
USPC .............. 363/21.06, 21.07, 21.12–21.17
See application file for complete search history.

(56) References Cited

U.S. PATENT DOCUMENTS

| | | | |
|---|---|---|---|
| 7,974,109 B2 * | 7/2011 | Kesterson | H02M 3/33515 363/21.16 |
| 8,587,970 B2 * | 11/2013 | Uno | H02M 1/4225 363/21.07 |
| 9,071,152 B2 | 6/2015 | Morong et al. | |
| 9,742,288 B2 | 8/2017 | Balakrishnan et al. | |
| 2006/0013022 A1 * | 1/2006 | Jitaru | H02M 1/38 363/21.12 |
| 2008/0112193 A1 | 5/2008 | Yan et al. | |
| 2008/0192515 A1 | 8/2008 | Huynh et al. | |
| 2010/0195355 A1 | 8/2010 | Zheng | |
| 2010/0208500 A1 * | 8/2010 | Yan | H02M 3/33523 363/21.12 |
| 2010/0321956 A1 * | 12/2010 | Yeh | H02M 3/33507 363/16 |
| 2011/0149612 A1 | 6/2011 | Yeh | |

(Continued)

*Primary Examiner* — Alex Torres-Rivera
(74) *Attorney, Agent, or Firm* — Haynes and Boone, LLP

(57) ABSTRACT

A flyback converter control architecture is provided in which primary-only feedback techniques are used to ensure smooth startup and detection of fault conditions. During steady-state operation, secondary-side regulation is employed. In addition, current limits are monitored during steady-state operation using primary-only feedback techniques to obviate the need for a secondary-side current sense resistor.

6 Claims, 2 Drawing Sheets

(56) References Cited

U.S. PATENT DOCUMENTS

| | | |
|---|---|---|
| 2011/0305043 A1 | 12/2011 | Matsumoto |
| 2012/0250366 A1 | 10/2012 | Wang et al. |
| 2013/0044520 A1 | 2/2013 | Cho et al. |
| 2013/0215651 A1 | 8/2013 | Liao et al. |
| 2015/0188442 A1 | 7/2015 | Kesterson et al. |
| 2016/0149504 A1 | 5/2016 | Quigley |
| 2016/0226239 A1 | 8/2016 | Yang et al. |
| 2016/0365801 A1* | 12/2016 | Phadke ............. H02M 3/33569 |
| 2017/0288553 A1* | 10/2017 | Fahlenkamp ..... H02M 3/33515 |

* cited by examiner

HYBRID SECONDARY-SIDE REGULATION

CROSS-REFERENCE TO RELATED APPLICATIONS

This application is a Divisional, and claims the benefit, of U.S. patent application Ser. No. 16/100,934, presently pending and filed on Aug. 10, 2018, which is a Continuation of International Patent Application No. PCT/US2018/013655 filed on Jan. 12, 2018, which claims the benefit of U.S. Provisional Patent Application No. 62/445,660 filed on Jan. 12, 2017, which applications are hereby incorporated by reference herein in their entireties.

TECHNICAL FIELD

This application relates to switching power converters, and more particularly to a hybrid secondary-side regulation scheme for flyback converters.

BACKGROUND

Switching power converters offer higher efficiency as compared to linear regulators. Although linear regulators are relatively inexpensive, they regulate a lower output voltage from a higher input voltage by simply burning the difference as heat. As a result, a linear regulator typically burns more power than is actually supplied to the load. In contrast, a switching power converter regulates its output voltage by delivering relatively small increments of energy through the cycling of a power switch. The power switch in a switching power converter is either off or on so that efficiency is markedly improved as compared to linear regulators. Switching power converters such as a flyback converter are thus typically used to charge the batteries for mobile devices.

Not only are flyback converters efficient, their transformers provide a safe isolation of the device being charged from the AC mains. But this isolation leads to a regulation problem since the output voltage (or output current) is delivered from the secondary winding of the transformer whereas the power switch is connected to the transformer's primary winding. A natural location for a controller is thus on the primary side to regulate the output power delivery by regulating the cycling of the power switch. But a primary-side controller cannot simply read the output voltage directly such as through a wire or lead because the isolation between the primary and secondary sides of the transformer would then be destroyed. It is thus conventional for the primary-side controller to receive feedback information about the output voltage through an isolating communication channel such as an optoisolator. Although the primary-side controller can then receive feedback information, the optoisolator causes stability issues and adds expense to the flyback converter design.

To avoid such stability and expense, flyback converter design evolved to use primary-only feedback. In primary-only feedback, the primary side senses the voltage on an auxiliary winding (or on the primary winding) at the moment when the secondary current has ramped down to zero following a cycling of the power switch. This moment is referred to as the transformer reset time and represents an ideal time to sample the output voltage indirectly through the auxiliary winding voltage since there is a linear relationship between the output voltage and the auxiliary winding voltage at the transformer reset time. But following the transformer reset time, the auxiliary winding voltage will begin resonantly oscillating. It is thus difficult to sample the auxiliary winding voltage at the precise moment of the transformer reset time. Moreover, noise and other non-idealities limit the accuracy of primary-only feedback. For example, the accuracy of regulating the output voltage through primary-only feedback is limited by non-perfect coupling of the transformer, secondary-side rectifier diode forward voltage drop variation, and synchronous rectification MOSFET Rds variation, component variation, and the converter load range and operation conditions.

Given the limitations for primary-only feedback, it is inapplicable to applications that demand extreme accuracy such as voltage regulation with no more than one percent error. To provide additional accuracy, various secondary-side regulation schemes have been implemented. As implied by the name, secondary-side regulation involves sensing the output voltage and comparing the sensed output voltage to a reference voltage to develop an error voltage. The error voltage is filtered to form a control voltage that is further processed by a power switch controller to control the power switch cycling. In one form of conventional secondary-side regulation, the secondary-side controller does the processing of the control voltage to generate an activity signal that forces the power switch to cycle on. In such an embodiment, the primary side may include a rudimentary controller that then switches the power switch off after a fixed peak current or on time is reached. Alternatively, the secondary-side controller may also control the off times as well as the on times for the power switch.

In lieu of sending an activity signal to stimulate a power switch cycle, other embodiments for conventional secondary-side regulation send the control voltage itself to a primary-side controller. The primary-side controller may then process the control voltage to control the power switch cycling accordingly. But regardless of whether an activity signal or the control signal is transmitted from the secondary side to the primary side, certain modes of operation are then hampered by the transition from primary-side feedback to secondary-side regulation. For example, the charging of a lithium battery must follow a certain transition between constant-voltage and constant-current modes of operation. In particular, modern smartphones are typically rather expensive yet their lithium battery (or batteries) is integrated permanently or semi-permanently in the smartphone's housing. Should a flyback converter destroy the battery through an improper charging sequence, the entire smartphone is then destroyed. It is thus critical that the proper constant-voltage and constant-current modes of operation be properly regulated during the battery charging process. But a secondary-side controller requires the insertion of a current sense resistor on the secondary side (or some other means of sensing the output current) to regulate a constant-current power delivery to the load. The addition of a current sense resistor into the output current path on the secondary side of a flyback converter with conventional secondary-side regulation lowers efficiency and increases manufacturing complexity and cost.

Accordingly, there is a need in the art for improved forms of secondary-side regulation.

SUMMARY

To avoid the pitfalls of conventional secondary-side regulation, a flyback converter is provided in which the primary-side controller retains primary-only feedback capability. For example, the primary-side controller may include a waveform analyzer that senses an auxiliary winding voltage through a Vsense pin or terminal. As known in the primary-only feedback arts, a waveform analyzer samples the Vsense pin voltage at the transformer reset time. But unlike conventional primary-only feedback, the output voltage regulation is not based on the sampled Vsense pin voltage. Instead, the output voltage regulation is based on secondary-side regulation (SSR).

In particular, the primary-side controller may calculate a desired peak current for the power switch transistor in a current power switch cycle based upon the output voltage feedback from SSR. For example, the secondary-side controller may compare the output voltage to a reference voltage to generate an error voltage that is then filtered in a loop filter to produce a control voltage. The secondary-side controller then transmits the control voltage to the primary-side controller. This control voltage is for implementing a constant-voltage mode of operation. For example, the primary-side controller may translate the control voltage into a switching frequency for pulse frequency modulation that would produce the desired constant output voltage. Alternatively, the primary-side controller may translate the control voltage into a peak current for the current power switch cycle that will produce the desired constant output voltage. But note the intelligent modulation that is achieved by retaining the ability to determine the transformer reset time, waveform shape, and timing information such as the voltage level, ring resonant period, and valley and peak detection from the sensing of the auxiliary winding voltage (in alternative embodiments, the primary winding voltage itself may be sensed to determine these factors). Since the primary-side controller knows the peak current at which the power switch transistor was cycled off, it also knows the peak current for the secondary winding current given the turn ratio of the transformer. The primary-side controller may thus determine the average output current based upon peak secondary current and the transformer reset time since the secondary winding current only flows over the duration of the transformer reset time. The primary-side controller may then adjust the peak current for a subsequent power cycle so that a desired output current is not violated.

For example, suppose the battery being charged is fairly depleted such that its voltage is rather low. This voltage may be communicated by the mobile device to the secondary-side controller since the charging occurs through a data cable such as a USB cable or a Lightning cable. Given this battery charge state, there is a corresponding output current limit (for example, 1 A, or 2 A, etc.). Should the output current exceed this limit, the battery could be damaged. The secondary-side controller may communicate this output current limit to the primary-side controller, which then monitors the transformer reset time accordingly to control whether a constant-current mode of operation should be instituted. The resulting regulation is thus quite advantageous because the output voltage accuracy of secondary-side regulation is enjoyed without the power-robbing need for a secondary-side sense resistor to enforce constant-current modes of operation should the output current exceed a constant-current limit. In addition, the intelligent detection and process of the Vsense waveform shape and timing information (as used herein, "Vsense" refers to the voltage signal being sensed using primary-only feedback techniques, regardless of whether such a voltage signal is derived from the auxiliary winding or from the primary winding) can achieve additional features, such as enabling smooth power converter startup, valley mode switching, as well as protections against various abnormal and fault conditions.

These advantageous features and additional inventive features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
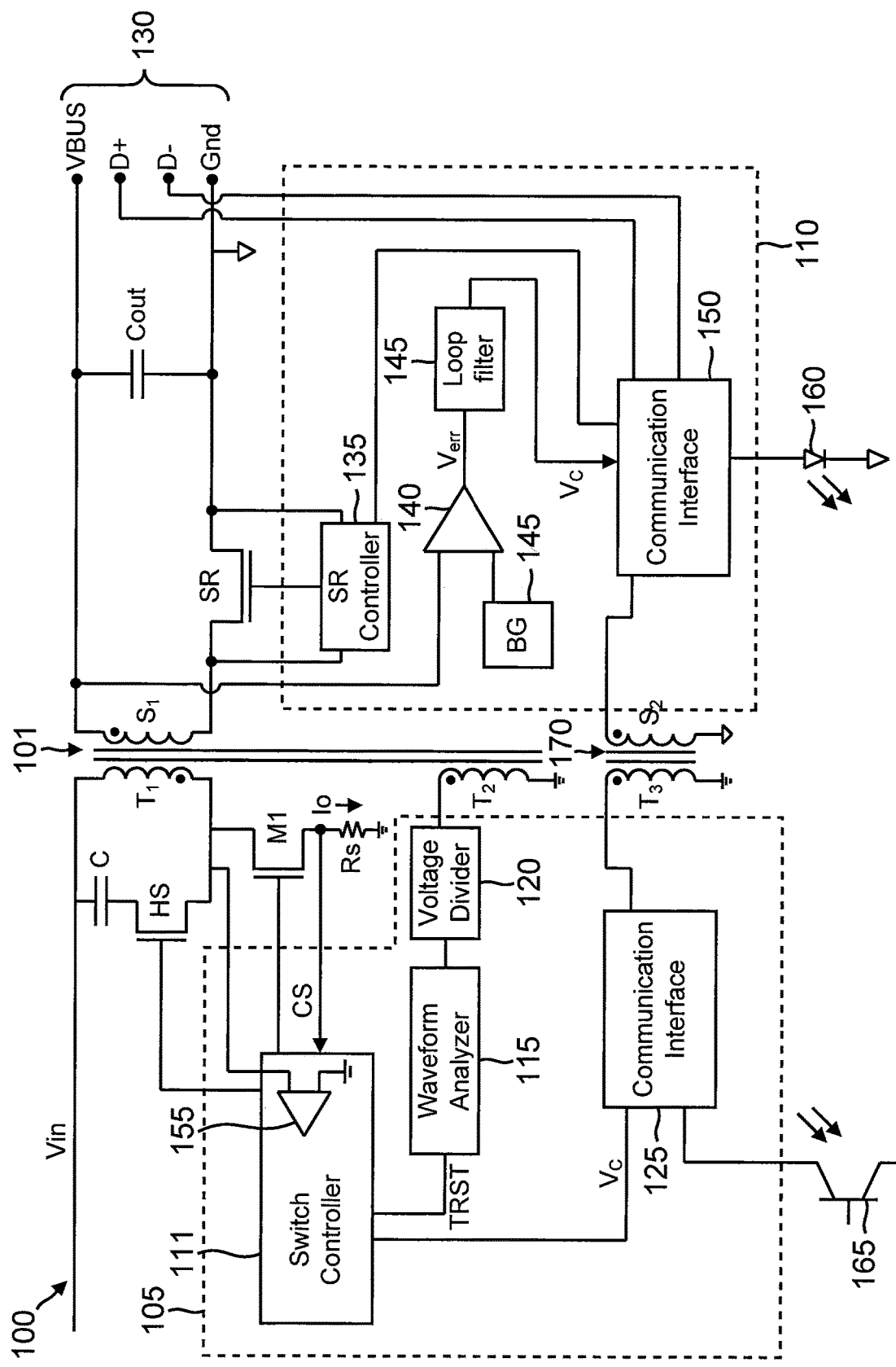
FIG. 1 is a circuit diagram of an improved flyback converter with hybrid secondary-side regulation in accordance with an aspect of the disclosure.

Turning now to the drawings, an example flyback converter 100 is shown in FIG. 1. A primary-side controller 105 includes a switch controller 111 for controlling the cycling of an NMOS power switch transistor M1. In alternative embodiments, other type of power switch transistors may be used such as GaN power switch transistor or a bipolar junction power switch transistor. When power switch transistor M1 is cycled on, a magnetizing current begins to flow through a primary winding T1 of a transformer 101 depending upon the input voltage Vin on an input voltage rail and the magnetizing inductance of primary winding T1. As known in the flyback converter arts, switch controller 111 may cycle power switch transistor M1 using valley-mode switching during low to moderate load levels. During high power modes of operation, however, it is more advantageous to cycle power switch transistor M1 using zero voltage switching.

To implement zero voltage switching, the drain of power switch transistor M1 connects to a source of an NMOS high side (HS) switch transistor that has a drain connected to the input voltage rail through a capacitor C. To effect zero voltage switching, switch controller 111 may cycle on the HS switch transistor after the power switch transistor M1 has been cycled off. The leakage inductance energy for winding T1 is then stored on capacitor C. When the HS switch transistor is cycled off, the drain of power switch transistor M1 will be pulled to ground. To detect the zero crossing for this drain voltage, switch controller 111 may include a zero-crossing detector such as a comparator 155 that compares the drain voltage to ground. When comparator 155 indicates that the drain voltage is discharged, switch controller 111 may then cycle on power switch transistor M1 in a subsequent switching cycle with the drain-to-source voltage for power switch transistor M1 being zero as known in the zero voltage switching arts.

A secondary winding S1 for transformer 101 does not conduct while the power switch transistor M1 is on. For example, a secondary-side controller 110 may include a synchronous rectifier (SR) controller 135 that monitors the drain-to-source voltage for an NMOS SR switch transistor. When the drain-to-source voltage for the SR switch transistor indicates that power switch M1 is switched off, SR controller 135 cycles on the SR switch transistor. As will be explained further herein, the on control of the SR switch transistor may be further responsive to a communication from primary-side controller 105 that power switch transistor M1 has been cycled off. In this fashion, the danger of punch through in which the SR switch transistor is cycled on while power switch transistor M1 is still conducting is avoided. SR controller 135 may also monitor the source-to-drain voltage for the SR switch transistor to determine when to cycle off the SR switch transistor.

Advantageously, secondary-side regulation of the output voltage is only implemented during steady-state operation. As will be explained further herein, primary-only feedback information is used by primary-side controller 105 to control a smooth start-up mode prior to the transition to steady-state operation. To perform secondary-side regulation of the output voltage during steady-state operation, secondary-side controller 110 includes an error amplifier 140 that generates an error voltage Verr responsive to a difference between the output voltage VBUS for the flyback converter and a reference voltage such as a bandgap voltage from a bandgap (BG) source 145. Note that a scaled version of both these voltages may be applied to error amplifier 140 in alternative embodiments. A loop filter 145 filters the error voltage to produce a control voltage Vc. This control voltage may then be communicated to primary-side controller 105 as discussed further herein.

The secondary winding current that flows when the SR switch transistor is on charges an output capacitor Cout with the output voltage VBUS. This output voltage charges a load (not illustrated) through a data cable interface such as a USB cable interface 130 that also includes a D+ terminal, a D− terminal, and a ground terminal as known in the data cable interface arts. A communication interface 150 monitors the data terminals D+ and D− to detect whether a mobile device has been connected to the data cable interface. Should a mobile device be detected, secondary-side controller 110 may alert primary-side controller 105 through an isolating communication channel such as a signal transformer 170 having a secondary winding S2 and a primary winding T3. Alternative isolating communication channels include an optoisolator such as formed through a photodiode 160 and a receiving bipolar junction transistor 165. Alternatively, a capacitor (not illustrated) may also be used to form a suitable isolating communication channel. Advantageously, signal transformer 170 is bidirectional so that it supports communication from secondary-side controller 110 to primary-side controller 105 as well as from primary-side controller 105 to secondary-side controller 110.

Communication interface 150 transmits the control voltage using digital or analog signaling through secondary winding S2 to induce a corresponding digital or analog signal on primary winding T3 that is received by a communication interface 125. In alternative embodiments, the error voltage may be transmitted such that primary-side controller 105 would perform the loop filtering. Communication interface 125 may then recover the control voltage (or error voltage) as a digital or analog signal so that it may be processed by switch controller 111. Switch controller 111 may then process the control voltage into either a pulse switching frequency as used in pulse frequency modulation or into a peak switch current for pulse width modulation as known in the flyback arts. Regardless of whether power switch transistor M1 is cycled according to pulse frequency or pulse width modulation, switch controller 111 will cycle power switch transistor M1 on and off accordingly. For example, in a pulse width modulation mode of operation, switch controller 111 determines a peak current for a current switching cycle for power switch transistor M1 responsive to the processing of the control voltage. This processing may involve the use of proportional-integral (PI) or a proportional-integral-differential (PID) control as known in the flyback arts. During the on-time for power switch transistor M1, switch controller 111 monitors the drain current ID conducted by power switch transistor M1 through a sense resistor Rs that couples between the source of power switch transistor M1 and ground. The resulting current sense (CS) voltage across the sense resistor represents the drain current. When switch controller 111 detects that the drain current (as sensed through the CS voltage) equals the desired peak current, it cycles off power switch transistor M1.

The resulting cycling of power switch transistor M1 based upon the processing of the control voltage results in a constant-voltage mode of operation for the output voltage VBUS. But as discussed earlier, there are modes of operation such as the initial stages of charging a discharged battery in which constant-voltage operation would result in too-high levels of output current flowing into the battery. To prevent such potentially dangerous levels of output current from occurring, primary-side controller 105 uses primary-only feedback techniques to detect the transformer reset time. Since the peak for the primary winding current is known, the peak for the secondary winding current is also known since it is proportional to the peak winding current through the turn ratio for transformer 101. Primary-side controller 105 may thus advantageously use the transformer reset time to calculate the average output current based upon the switching period, the peak secondary winding current, and the transformer reset time. Should this average output current exceed a current limit, switch controller 111 may then "ignore" the control voltage in the next switching cycle and instead control the on-time for power switch transistor M1 to produce the desired peak current as monitored through the primary-only feedback technique.

The resulting hybrid control is quite advantageous because flyback converter 100 then enjoys accurate constant-voltage operation as implemented through secondary-side regulation without the power-robbing need for a sense resistor on the secondary side of transformer 101. To detect the transformer reset time, primary-side controller 105 may sense an auxiliary winding voltage on an auxiliary winding T2 through a voltage divider 120. The resulting divided auxiliary winding voltage is then processed by a waveform analyzer to detect the "knee" in the auxiliary winding voltage. This may be better appreciated with reference to FIG. 2, which shows the auxiliary winding voltage VAUX responding to the cycling off of the power switch at a time t0. In response, the auxiliary winding voltage will jump high. Following some Gibbs oscillation, the auxiliary winding voltage will then slowly ramp down as the secondary current (not illustrated) ramps to zero. When the secondary current is depleted, the auxiliary winding voltage hits its knee at time t1, whereupon it falls rapidly and begins resonantly oscillating. The duration between times t0 and t1 is the transformer reset time (TRST).

Figure 2:
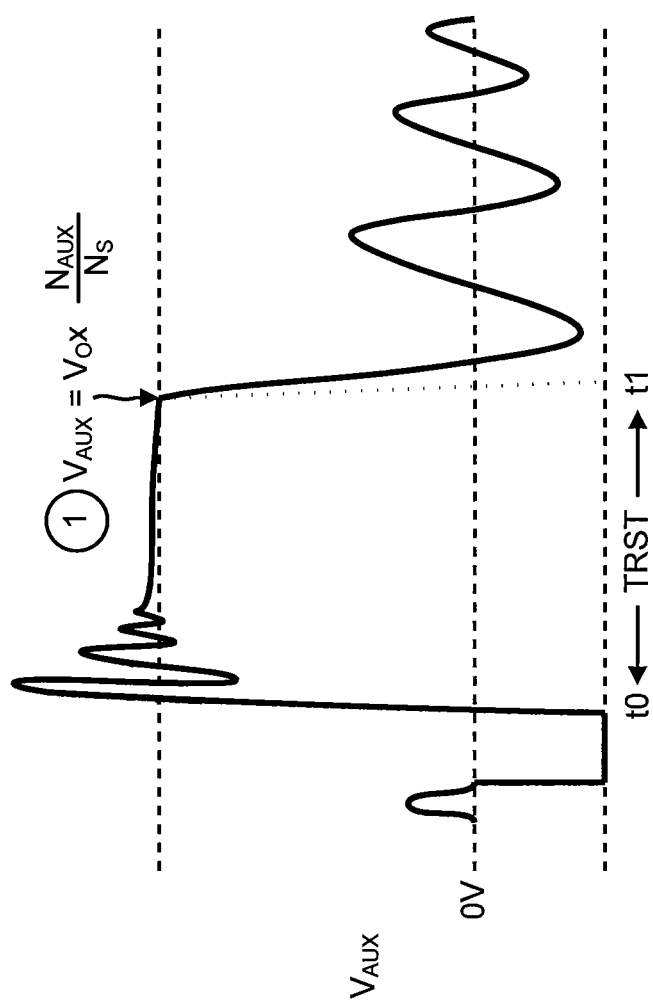
FIG. 2 shows the auxiliary winding voltage waveform during the detection of the transformer reset time.

It would be conventional in primary-only feedback to detect an output voltage Vo through inversion of the equation 1 shown in FIG. 2. But the secondary-side regulation has provided this output voltage much more accurately. What is desired by primary-side controller 105 is thus the transformer reset time itself so that the output current may be determined. As known in the primary-only feedback arts, there are a number of ways of detecting the knee (and hence the transformer reset time) as well as other waveform shape and timing information such as the knee voltage, the duration of the waveform, the resonant ringing period, and also valley and peak detection so that the details of waveform analyzer 115 would be understood to those of ordinary skill in the art. Regardless of how the transformer reset time is detected by primary-side controller 105, switch controller 111 may then proceed to calculate the output current accordingly.

But note that the Vsense waveform itself may be also be used by primary-side controller 105 for purposes besides just detecting the transformer reset time. For example, primary-side controller 105 may use the knee voltage as well as the current sense voltage to ensure a smooth transition of the output voltage during startup. For example, when flyback converter 100 is starting up from zero or very low output voltage, the output voltage regulation is far away from its steady state, so that it is difficult to have a smooth increase of the output voltage. By intelligently processing and utilizing the Vsense and current sense information in the primary side, flyback converter 100 can achieve smooth startup, without overshoot, undershoot, oscillation or other undesirable behaviors. Once the startup is finished and voltage is settled to close to the reference point, the primary-side control may switch to the secondary-side regulation which will achieve much accurate voltage regulation at steady state. In addition, waveform analyzer 115 may be configured for valley detection so that switch controller 111 may switch on power switch transistor M1 according to valley-mode switching. Note also that the ability to monitor the Vsense waveform enables primary-side controller 105 to detect abnormal or fault conditions such as auxiliary winding open circuit, a short circuit, or a soft short circuit. In particular, the Vsense waveform will stay at zero volts if the auxiliary winding T2 is grounded due to, for example, a circuit board fault. Waveform analyzer 115 may then detect this lack of a Vsense waveform so that switch controller 111 may stop the cycling of power switch transistor M1. An open circuit for auxiliary winding T3 will also cause an abnormal Vsense waveform that may be detected by waveform analyzer 115 so that switch controller 115 may stop the cycling of power switch transistor M1. Other fault examples may include a current sense (CS) resistor short (or partial short), CS resistor open circuit, and controller pins short or open. By intelligently processing and utilizing these indications at the primary side, primary-side controller 105 can detect the abnormality and fault and do quick proper action such as turning off the power switch, without waiting for secondary-side controller 110 to do the detection and send the alert which would be too late.

Those of ordinary skill in the art will also appreciate that numerous modifications may be made for flyback converter 100. For example, primary-side controller 105 may alert secondary-side controller 110 of the on/off status of the HS and M1 power switches. In this fashion, the dangers of punch-through and also erroneous zero-voltage switching may be avoided. In addition, the detection of the transformer reset time enables switch controller 111 to detect for short or open circuits at auxiliary winding T3 so that secondary-side controller 110 may be alerted accordingly. In addition, the detection of the transformer reset time and other waveform shape and timing information enables switch controller 111 to detect for over-voltage or under-voltage conditions so that primary-side controller 105 may be alerted accordingly. In summary, the flyback converter will retain primary-only feedback techniques, features and capability while exploiting secondary-side regulation for steady-state voltage regulation, and also it will have the bi-directional communication between primary and secondary sides. Those of some skill in this art will thus appreciate that numerous modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:
1. A method for a flyback converter, comprising:
during a constant-voltage mode of operation in a secondary-side controller for the flyback converter, comparing an output voltage for the flyback converter to a reference voltage to determine a control voltage;
transmitting the control voltage from the secondary-side controller to a primary-side controller;
in a pulse width modulation mode of operation for the flyback converter, processing the control voltage to determine a desired peak current for a power switch;
following a cycling on of the power switch in a first power switch cycle, switching off the power switch responsive to a current through the power switch equaling the desired peak current;
following the switching off of the power switch, determining a transformer reset time from an auxiliary winding voltage;
determining an average output current for the flyback converter from the transformer reset time and the peak current through the power switch; and
when the average output current is greater than an output current limit, transitioning the flyback converter to a constant-current mode of operation in a second power switch cycle following the first power switch cycle in which the primary-side controller does not use the control voltage.
2. The method of claim 1, wherein comparing the output voltage for flyback converter to the reference voltage comprises generating an error voltage, the method further comprising filtering the error voltage in a loop filter to produce the control voltage.
3. The method of claim 1, further comprising:
from the primary-side controller, transmitting an on and off status of the power switch to the secondary-side controller.
4. The method of claim 3, further comprising:
controlling a synchronous rectifier switch to be off responsive to the on status of the power switch.
5. The method of claim 1, further comprising:
cycling a high side switch following the cycling off of the power switch to discharge a voltage across the power switch.
6. The method of claim 5, further comprising:
from the primary-side controller, transmitting an on and off status of the high side switch to the secondary-side controller.

* * * * *